(12) United States Patent
Kim et al.

(10) Patent No.: US 7,162,257 B2
(45) Date of Patent: Jan. 9, 2007

(54) FAST PAGING METHOD IN A CODE DIVISION MULTIPLE ACCESS MOBILE COMMUNICATION SYSTEM

(75) Inventors: Yu-Chul Kim, Seoul (KR); Purva Rajkotia, Richardson, TX (US); Dae-Gyun Kim, Seongnam-si (KR); Beom-Sik Bae, Suwon-si (KR); Jung-Soo Jung, Seoul (KR)

(73) Assignee: Samsung Electronics Co., Ltd. (KR)

(*) Notice: Subject to any disclaimer, the term of this patent is extended or adjusted under 35 U.S.C. 154(b) by 189 days.

(21) Appl. No.: 10/878,698

(22) Filed: Jun. 28, 2004

(65) Prior Publication Data

US 2005/0090269 A1    Apr. 28, 2005

(30) Foreign Application Priority Data

Oct. 7, 2003   (KR) .................... 10-2003-0069743

(51) Int. Cl.
*H04Q 7/00* (2006.01)
(52) U.S. Cl. .................... 455/458; 455/422.1
(58) Field of Classification Search ............. 455/458, 455/422.1, 515, 561, 466, 450, 343.1, 567, 455/426.1, 455
See application file for complete search history.

(56) References Cited

U.S. PATENT DOCUMENTS

| | | | |
|---|---|---|---|
| 6,687,285 B1* | 2/2004 | Jou | 375/133 |
| 2004/0185879 A1* | 9/2004 | Kong et al. | 455/458 |
| 2005/0009535 A1* | 1/2005 | Cherian | 455/455 |
| 2005/0036464 A1* | 2/2005 | Rajkotia et al. | 370/336 |

* cited by examiner

*Primary Examiner*—Melody Mehrpour
(74) *Attorney, Agent, or Firm*—The Farrell Law Firm (57) ABSTRACT

A fast paging method of a mobile station (MS), comprising the steps of: receiving from a base station (BS) a page message containing information related to a requested period of a slot cycle and a information related to a maximum of an end time of maintaining the period of the slot cycle in an idle state; and changing the period of the slot cycle based on the information related to the requested period of the slot cycle and maintaining the changed period of the slot cycle until the end time based on the information related to the maximum of the end time; and monitoring a paging channel at the changed period of the slot cycle.

17 Claims, 6 Drawing Sheets

FIG.1

| Field | Length (bits) |
|---|---|
| PAGE_REASON | 2 |
| SERVICE_OPTION | 0 or 16 |
| RSC_INCL | 0 or 1 |
| MAX_T_RSC | 0 or 6 |
| REQ_RSCI | 0 or 4 |
| NON_SLOTTED_INCL | 0 or 1 |
| MAX_T_SLOTTED | 0 or 6 |

FIG.2

| Field | Length (bits) |
|---|---|
| RSC_INCL | 1 |
| T_RSC | 0 or 6 |
| REQ_RSCI | 0 or 4 |
| NON_SLOTTED_INCL | 1 |
| T_SLOTTED | 0 or 6 |

FIG.3

| Order Specific Field | Length (bits) |
|---|---|
| ORDQ | 8 |
| RSC_INCL | 1 |
| REQ_RSCI | 0 or 4 |
| MAX_T_RSC | 0 or 6 |
| NON_SLOTTED_INCL | 1 |
| MAX_T_SLOTTED | 0 or 6 |

FIG.4

| Order Specific Field | Length (bits) |
|---|---|
| ORDQ | 8 |
| RSC_INCL | 1 |
| RSCI | 0 or 4 |
| T_RSC | 0 or 6 |
| NON_SLOTTED_INCL | 1 |
| T_SLOTTED | 0 or 6 |

FAST PAGING METHOD IN A CODE DIVISION MULTIPLE ACCESS MOBILE COMMUNICATION SYSTEM

PRIORITY

This application claims priority under 35 U.S.C. § 119 to an application entitled "Fast Paging Method in a Code Division Multiple Access Mobile Communication System" filed in the Korean Intellectual Property Office on Oct. 7, 2003 and assigned Serial No. 2003-69743, the contents of which are incorporated herein by reference.

BACKGROUND OF THE INVENTION

1. Field of the Invention

The present invention relates generally to a paging method in a mobile communication system, and in particular, to a method for supporting fast paging by changing a paging channel monitoring cycle for a mobile station (MS).

2. Description of the Related Art

In a code division multiple access (CDMA) system, an MS monitors a channel to receive a message or data from a base station (BS). The channel monitoring is carried out in a non-slotted mode or in a slotted mode. The channel is continuously monitored in the former, while it is monitored only periodically at predetermined points of time in the latter. Due to the continuous channel monitoring, the non-slotted mode operation leads to large battery consumption in the MS. To save battery power, the MS typically operates in the slotted mode when it is in an idle state. In the slotted mode, the MS monitors a paging channel at a predetermined cycle of one or two slots. The paging channel monitoring period is determined by a slot cycle index (SCI).

To determine the SCI, the MS first notifies a BS of an intended slot cycle through an Origination Message, a Registration Message, or a Page Response Message. The BS tells the MS a maximum available SCI (MAX_SLOT_CYCLE_INDEX) through a System Parameter Message (SPM) or an MC-RR Parameter Message (MCRRPM). Each time the MS receives the SPM or MCRRPM, the MS updates its SCI value (SLOT_CYCLE_INDEXs) to the lesser of the MAX_SLOT_CYCLE_INDEX and its desired SCI (SLOT_CYCLE_INDEXp). That is, the MS determines the lesser of the MAX_SLOT_CYCLE_INDEX and the SLOT_CYCLE_INDEXp as the SLOT_CYCLE_INDEXs. In actual operation, the MS can use a value less than or equal to the SLOT_CYCLE_INDEXs as the SCI.

The SCI can vary due to many factors. Since SLOT_CYCLE_INDEXp is an internally stored value in the MS, the user of the MS can intentionally change the value. Also, each BS may set a different value as the MAX_SLOT_CYCLE_INDEX. Hence, as the MS moves to another BS, system or network, the SCI available to the MS can be changed. The change of the SCI entails parameter change registration.

In a group call service, a push-to-talk (PTT) function allows a portable terminal to take on a walkie talkie type functionality through shortening of a call connection time where a user is able to set up a one-to-one or one-to-multiparty connection between portable terminals. Chatting and instant messaging are examples of the PTT service. The implementation of the PTT service requires fast call setup. To fast respond to a BS request, the MS needs to continuously monitor the paging channel. The non-slotted mode paging channel monitoring enables a fast response, but it nonetheless consumes much power relative to the slotted mode operation. As a result, the battery of the MS runs out of power in a shorter time. However, the conventional slotted mode operation reduces the battery power consumption but makes the MS respond slowly.

In this context, the BS can allow the MS to operate with a desired SCI in a reduced slot cycle (RSC) mode. The RSC mode was introduced in CDMA2000 Release D. It can expand the SCI even to a negative number. That is, the SCI can be set to one of "−4, −3, −2, −1, 0, 1, 2, 3, 4, 5, 6, 7". If it is set to −4, the MS monitors the paging channel every slot.

Traditionally, to change the SCI, the MS indicates its desired SCI through the Origination Message, the Registration Message or the Page Response Message. Or, the MS transmits the SCI through a Release Order when transitioning from a traffic state to a release state. There are no other alternatives.

That is, the BS can neither intentionally change the SCI of the MS nor adjust the SCI when the MS is in an idle state.

SUMMARY OF THE INVENTION

An object of the present invention is to substantially solve at least the above problems and/or disadvantages and to provide at least the advantages below. Accordingly, an object of the present invention is to provide a fast paging method in which a BS intentionally changes a paging channel monitoring cycle for an MS.

Another object of the present invention is to provide a fast paging method in which a paging channel monitoring cycle is changed for an MS when the MS operates in a slotted mode in an idle state.

The above objects are achieved by providing a fast paging method of a mobile station (MS), comprising the steps of: receiving from a base station (BS) a page message containing information related to a requested period of a slot cycle and a information related to a maximum of an end time of maintaining the period of the slot cycle in an idle state; and changing the period of the slot cycle based on the information related to the requested period of the slot cycle and maintaining the changed period of the slot cycle until the end time based on the information related to the maximum of the end time; and monitoring a paging channel at the changed period of the slot cycle.

The above objects are achieved by providing a fast paging method of a mobile station (MS), comprising the steps of: transmitting to a base station (BS) an order message with an order qualification code (ORDQ) set to zero, the order message containing information related to a period of a slot cycle and information related to an end time of maintaining the period of the slot cycle in an idle state; and changing the period of the slot cycle based on the information related to the period of the slot cycle and maintaining the changed period of the slot cycle until the end time based on the information related to the end time; and monitoring a paging channel at the changed period of the slot cycle The above objects are achieved by providing a fast paging method of a mobile station (MS), comprising the steps of: transmitting to the MS a page message containing information related to a requested period of a slot cycle and information related to a maximum of an end time of maintaining the period of the slot cycle in an idle state; and receiving from the MS a page response message containing information related to a period of the slot cycle and information related to the end time determined; and changing the period of the slot cycle based on the information related to the period of the slot cycle and maintaining the changed period of the slot cycle until the end time based on the information related to the maximum of the end time.

The above objects are achieved by providing a fast paging method of a mobile station (MS), comprising the steps of: receiving from the MS an order message with a order qualification code (ORDQ) set to zero, the order message containing information related to a period of a slot cycle and information related to an end time of maintaining the period of the slot cycle in an idle state; and transmitting to the MS an order message with a order qualification code (ORDQ) set to one, the order message containing information related to a maximum of an end time; changing the period of the slot cycle based on the information related to the period of the slot cycle and maintaining the changed period of the slot cycle until the end time based on the information related to the end time.

The above objects are achieved by providing a mobile station supporting a fast paging, comprising means for receiving from a base station (BS) a page message containing information related to a requested period of a slot cycle and a information related to a maximum of an end time of maintaining the period of the slot cycle in an idle state; and means for changing the period of the slot cycle based on the information related to the requested period of the slot cycle and maintaining the changed period of the slot cycle until the end time based on the information related to the maximum of the end time; and means for monitoring a paging channel at the changed period of the slot cycle The above objects are achieved by providing a mobile station supporting a fast paging, comprising means for transmitting to a base station (BS) an order message with an order qualification code (ORDQ) set to zero, the order message containing information related to a period of a slot cycle and information related to an end time of maintaining the period of the slot cycle in an idle state; and means for changing the period of the slot cycle based on the information related to the period of the slot cycle and maintaining the changed period of the slot cycle until the end time based on the information related to the end time; and means for monitoring a paging channel at the changed period of the slot cycle.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a fast paging method in a CDMA mobile communication system, in which a BS changes the SCI of an MS in an idle state so that the MS operates in an RSC mode for a predetermined time period, or in which the BS transitions the MS to a non-slotted mode and operates the MS in the non-slotted mode for a predetermined time period. Depending on an RSC index (RSCI) changing mechanism for fast paging, the present invention can be implemented in three embodiments.

A first embodiment is where the BS changes the SCI by a Page Message. A second embodiment is where the BS changes the SCI by a Mode Transition Order in an idle state. A third embodiment is where the BS changes the SCI by a Release Order in an idle state.

First Embodiment

Figure 1:
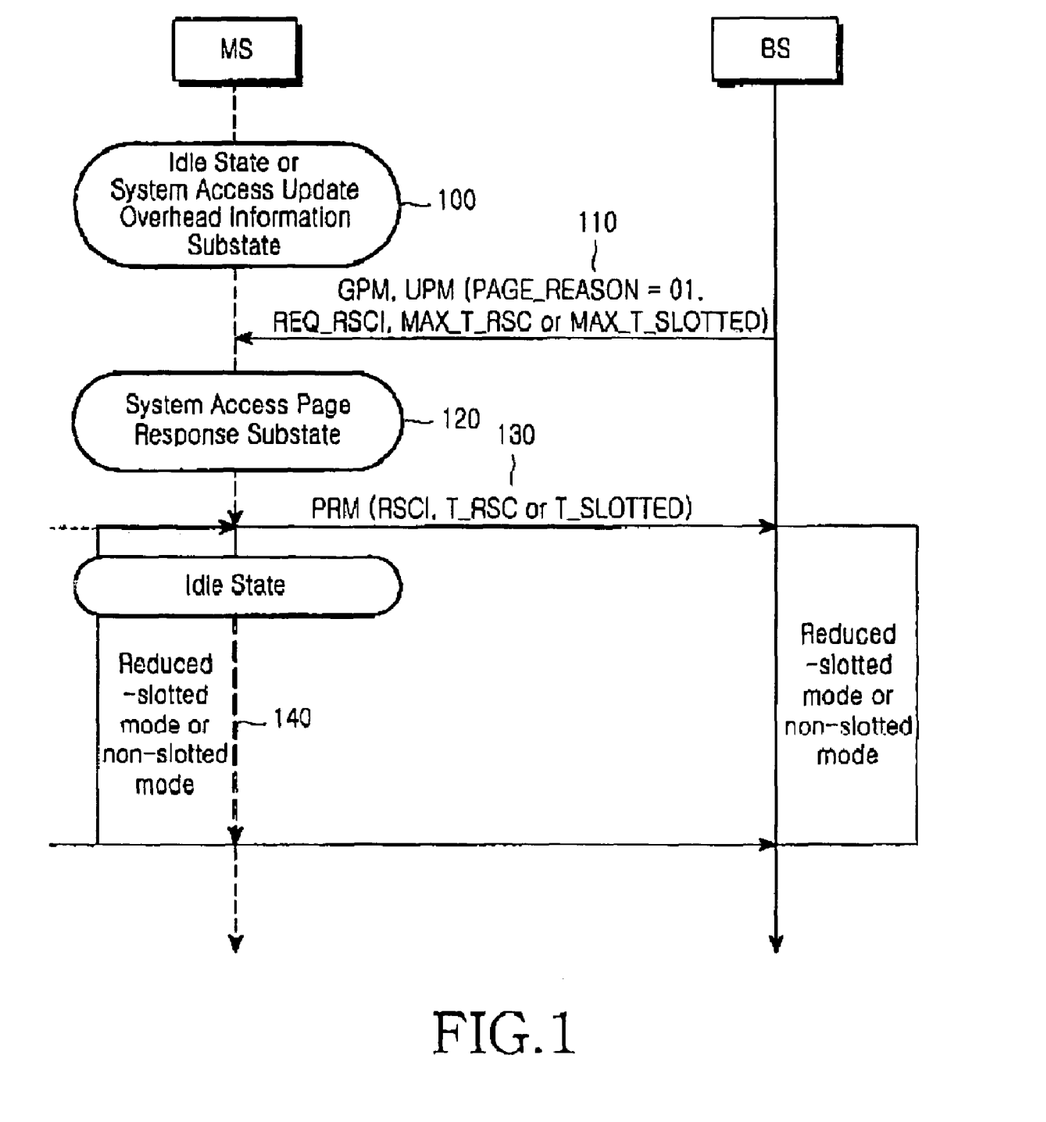
FIG. 1 is a diagram illustrating a signal flow for an SCI changing method for fast paging according to an embodiment of the present invention.

FIG. 1 is a diagram illustrating a signal flow for an SCI changing method for fast paging according to an embodiment of the present invention.

Referring to FIG. 1, an MS can support the RSC mode and receive a Page Message on a paging channel (PCH) or a forward common control channel (F-CCCH) in an idle state or in a system access update overhead information substate.

The MS operates in the idle state or in the system access update overhead information substate in step 100. In step 110, a BS transmits a Page Message to the MS in order to change the RSCI of the MS. The Page Message is illustrated in FIG. 2.

Figure 2:
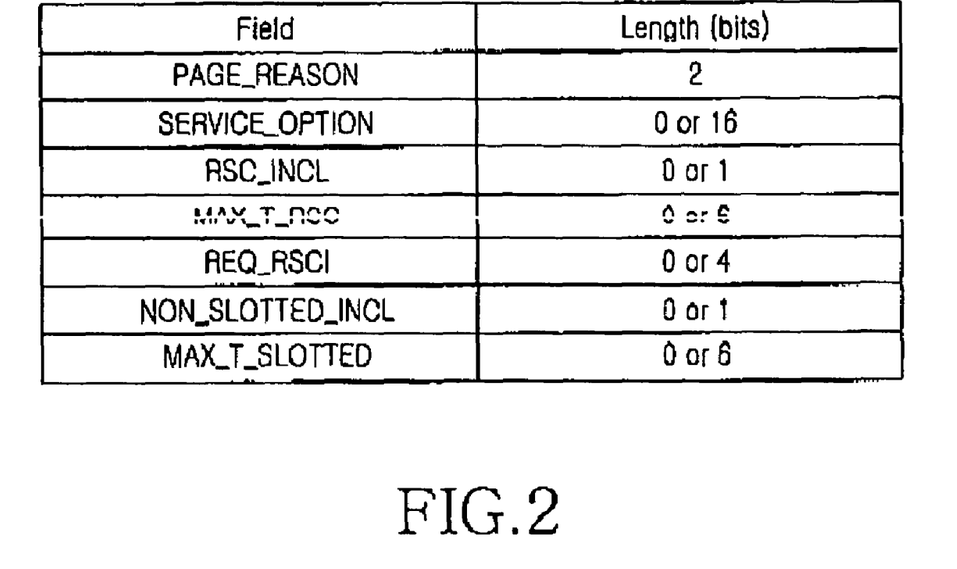
FIG. 2 is a table illustrating the format of a Page Message according to the embodiment of the present invention.

Referring to FIG. 2, PAGE_REASON provides a reason for paging, RSC_INCL indicates whether or not the MS operates in the RSC mode, MAX_T_RSC provides a maximum RSC timer value during which the MS is allowed to operate in the RSC mode, REQ_RSCI has an SCI which the BS wants the MS to operate with, NON_SLOTTED_INCL indicates whether or not the BS wants the MS to operate in an enhanced non-slotted mode, and MAX_T_SLOTTED has a maximum non-slotted mode timer value.

PAGE_REASON is a 2-bit field. Table 1 below lists values for PAGE_REASON and their meanings.

TABLE 1

| PAGE_REASON | description |
| --- | --- |
| 00 | Direct Channel Assignment |
| 01 | Reduced Slot Cycle mode |
| 10,11 | RESERVED |

Referring to Table 1, if PAGE_REASON is "00", a service option code corresponding to a requested service option is set. If PAGE_REASON is "01", it means that the Page Message has information related to the RSC mode. If PAGE_REASON is "01", RSC_INCL or NON_SLOTTED_INCL is set. In this case, both RSC_INCL and NON_SLOTTED_INCL cannot be set to "1" at the same time. Only when PAGE_REASON is "01", RSC_INCL or NON_SLOTTED_INCL is set. Otherwise, RSC_INCL and the subsequent fields are omitted.

If the BS intends to operate the MS in the RSC mode, the BS sets RSC_INCL to 1. Otherwise, it sets RSC_INCL to 0. In the former case, MAX_T_RSC and REQ_RSCI are set. In the latter case, MAX_T_RSC and REQ_RSCI are omitted. MAX_T_RSC includes two subfields: T_UNIT and T_INTERVAL.

TABLE 2

| subfield | Length | Subfield description |
| --- | --- | --- |
| T_UNIT | 2 | timer units, where<br>'00'-unit in 5 seconds<br>'01'-unit in 20 seconds<br>'10'-unit in 60 seconds<br>'11'-RESERVED |
| T_INTERVAL | 4 | timer interval |

Referring to Table 2, T_INTERVAL indicates a timer interval at which a timer activates and T_UNIT provides 2-bit information about timer units. According to the value of T_INTERVAL, a timer value is determined as illustrated in Table 3.

TABLE 3

| T_UNIT | timer value |
| --- | --- |
| 00 | ((T_INTERVAL + 1) * 5) seconds |
| 01 | ((T_INTERVAL + 1) * 20) + 80 seconds |
| 10 | ((T_INTERVAL + 1) * 60) + 400 seconds |
| 11 | RESERVED |

Meanwhile, REQ_RSCI is determined as illustrated in Table 4 below.

TABLE 4

| RSCI | Equivalent Slot Cycle Index | Slot Cycle Length |
| --- | --- | --- |
| 0100 | −4 | 0.08 s (1 slot) |
| 0011 | −3 | 0.16 s (2 slot) |
| 0010 | −2 | 0.32 s (4 slot) |
| 0001 | −1 | 0.64 s (8 slot) |
| 1000 | 0 | 1.28 s (16 slot) |
| 1001 | 1 | 2.56 s (32 slot) |
| 1010 | 2 | 5.12 s (64 slot) |
| 1011 | 3 | 10.24 s (128 slot) |
| 1100 | 4 | 20.48 s (256 slot) |
| 1101 | 5 | 40.96 s (512 slot) |
| 1110 | 6 | 81.92 s (1024 slot) |
| all other value | | |

NON_SLOTTED_INCL indicates whether or not the BS wants the MS to operate in the enhanced non-slotted mode. If the BS does, NON_SLOTTED_INCL is set to 1. Otherwise, it is set to 0. This field is also set only when PAGE_REASON is "01". If PAGE_REASON is not "01", NON_SLOTTED_INCL is omitted. Notably, both RSC_INCL and NON_SLOTTED_INCL cannot be set to "1" at the same time.

MAX_T_SLOTTED provides a maximum non-slotted mode timer value. If NON_SLOTTED_INCL is 0, MAX_T_SLOTTED is omitted. If NON_SLOTTED_INCL is not 0, a maximum non-slotted mode timer value is set in MAX_T_SLOTTED. Like MAX_T_RSC, MAX_T_SLOTTED includes two subfields: T_UNIT and T_INTERVAL. The setting and coding of the subfields are the same as those of the counterparts of MAX_T_RSC.

Returning to FIG. 1, upon receipt of the Page Message in step 110, the MS analyzes the received message having the format illustrated in FIG. 2, after a page match operation. The Page Message may have RSC_INCL set to 1 or NON_SLOTTED_INCL set to 1. That is, the BS can select one of the RSC mode and the enhanced non-slotted mode for the MS. Step 110 and the following steps will be described in both cases.

1. RSC_INCL=1

When RSC_INCL is 1, the MS can achieve a BS-requested RSCI (REQ_RSCI) and a maximum RSC timer value (MAX_T_RSC) from the Page Message.

The MS selects the lesser value between REQ_RSCI and SLOT_CYCLE_INDEXs, compares the selected value with a minimum available SCI, and uses the larger value as its SCI. Because MAX_T_RSC is a maximum RSC timer value, the MS cannot operate in the RSC mode longer than MAX_T_RSC. Thus, the MS selects a timer value less than or equal to the received maximum RSC timer value and operates in the RSC mode for a time period corresponding to the selected timer value.

Figure 3:
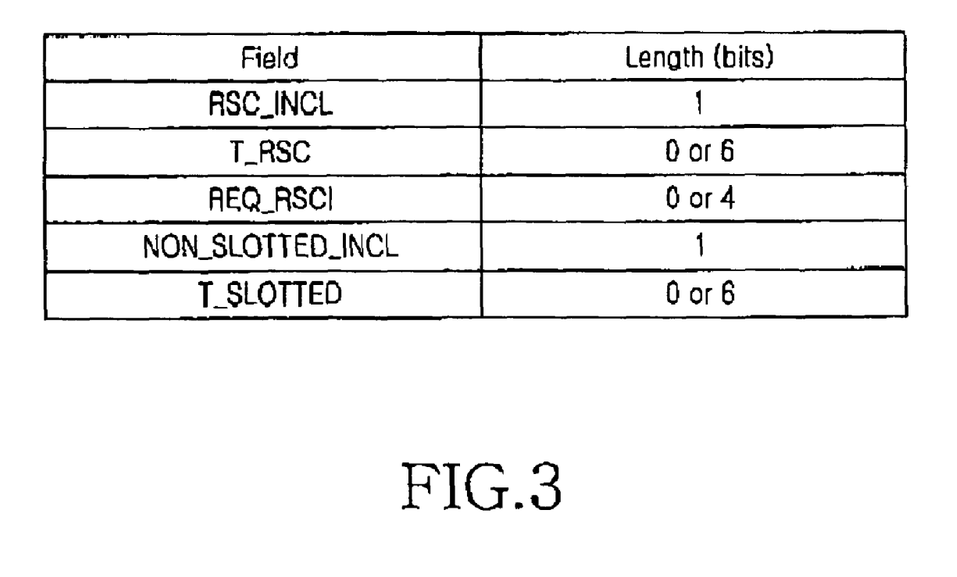
FIG. 3 is a table illustrating the format of a Page Response Message according to the embodiment of the present invention.

The MS transitions to a page response substate to transmit a Paging Response Message (PRM) containing the determined information in step 120 and transmits the PRM containing the determined RSCI and RSC timer value to the BS in step 130. An exemplary format of the PRM is illustrated in FIG. 3. The setting and coding of the PRM are done in the same manner as the Page Message illustrated in FIG. 2, except that the PRM includes RSCI and T_RSC fields. RSCI and T_RSC indicate an RSCI and an RSC timer value to be used between the MS and the BS, respectively. The BS determines from the PRM the RSCI and RSCI timer value with which the MS will operate in the RSC mode. The BS uses the values without modification.

Along with the transmission of the PRM, the MS sets an RSC mode timer to the determined RSC timer value. Then, the MS transitions to the idle state and operates in the RSC mode in step 140.

When a fast call setup procedure for PTT is initiated during the ongoing RSC timer activation, the MS can respond faster than in a normal slotted mode, thereby reducing call setup time. If the BS intends to change the SCI of the MS for the timer activation period, the BS can transmit another Page Message containing a new RSCI.

Upon expiration of the RSC timer, the MS operates again in the slotted mode. If the BS is to operate the MS in the RSC mode, steps 100 through 130 are repeated.

2. NON_SLOTTED_INCL=1

When RSC_INCL is 0 and NON_SLOTTED_INCL is 1, the Page Message includes information related not to the RSC mode but to the enhanced non-slotted mode. Thus, the MS can achieve a maximum non-slotted mode timer value (MAX_T_SLOTTED) indicating a maximum time period for which the MS operates in the non-slotted mode. In the same manner as for setting the RSCI, the MS transmits to the BS a PRM containing a non-slotted mode timer value less than or equal to MAX_T_SLOTTED in T_SLOTTED in step 130. The MS operates in the non-slotted mode in step 140. Upon expiration of a non-slotted mode timer, the MS returns to the slotted mode.

Second Embodiment

In accordance with the second embodiment of the present invention, an RSCI is changed by a Mode Transition Order.

The BS (or the MS) originates a Mode Transition Order (Order Qualification Code:ORDQ=0) requesting the RSC mode operation or the non-slotted mode operation and transmits it to the MS (or the BS). The MS (or the BS) determines REQ_RSCI and T_RSC, or T_SLOTTED and transmits a Mode Transition Order (ORDQ=1) containing the values to the BS (or the MS). A Mode Transition Order of the same configuration is used as a request message and a response message.

Figure 4:
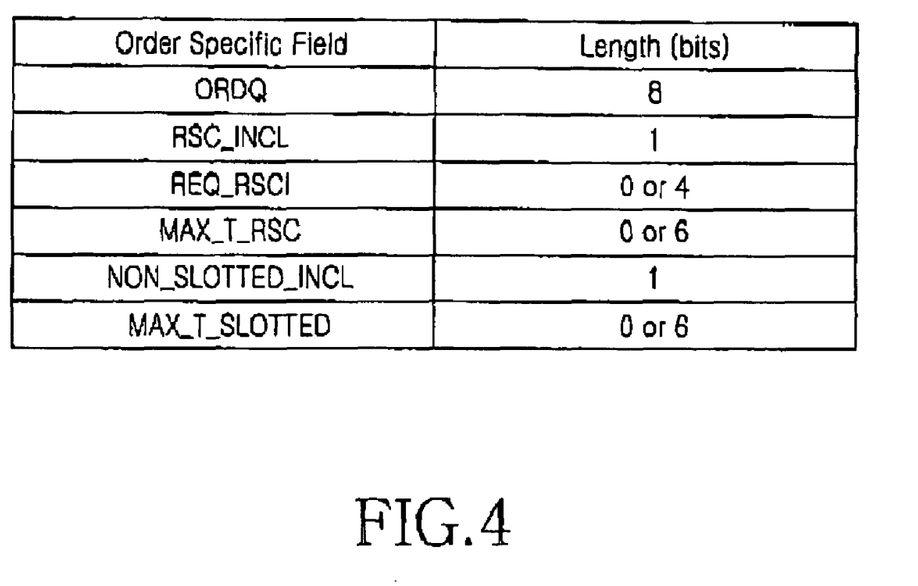
FIG. 4 is a table illustrating the format of a Mode Transition Order transmitted from a BS to an MS according to another embodiment of the present invention.

The format of the Mode Transition Order will be described with reference to FIGS. 4 and 5,. FIG. 4 illustrates the format of a Mode Transition Order that the BS transmits to the MS and FIG. 5 illustrates the format of a Mode Transition Order that the MS transmits to the BS.

Figure 5:
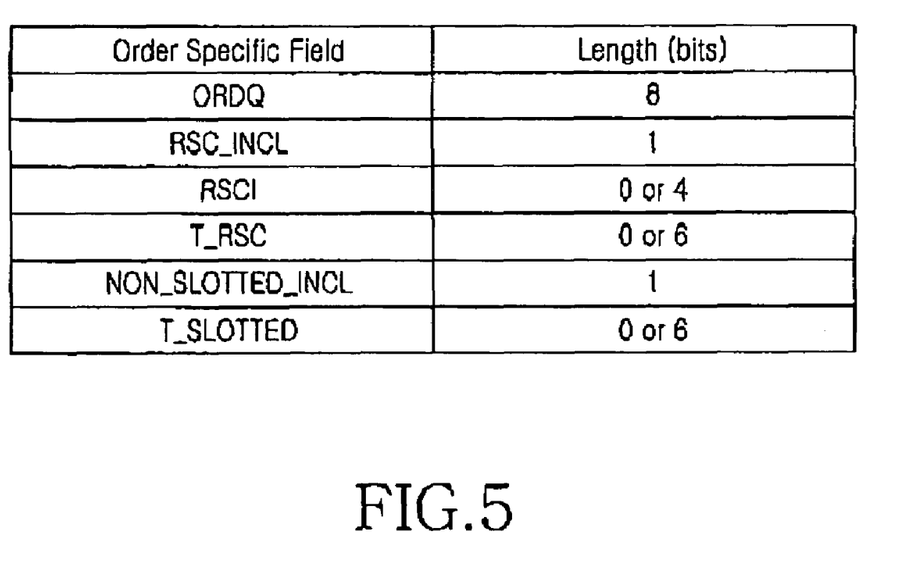
FIG. 5 is a table illustrating the format of a Mode Transition Order transmitted from the MS to the BS according to the second embodiment of the present invention.

Referring to FIGS. 4 and 5, ORDQ is set to 0 when the Mode Transition Order is originated to request the RSC mode operation or the non-slotted mode operation and it is set to 1 when the Mode Transition Order is a response message for the request. If RSC_INCL is 1 in the Mode Transition Order illustrated in FIG. 4, the BS sets a requested SCI in REQ_RSCI and a maximum timer value for the RSCI mode operation in MAX_T_RSC. If RSC_INCL is 0, RSCI and MAX_T_RSC are omitted. If NON_SLOTTED_INCL is 1, a maximum timer value for the non-slotted mode operation is set in MAX_T_SLOTTED. In the Mode Transition Order illustrated in FIG. 5, if RSC_INCL is 1, the MS sets a determined SCI in RSCI and a timer value for the RSCI mode operation in T_RSC. If NON_SLOTTED_INCL is 1, the MS sets a timer value for the non-slotted mode operation in T_SLOTTED.

The Mode Transition Order is different from the Page Message in that the BS can transmit to the MS the Mode Transition Order containing all fields associated with both the RSC mode and the non-slotted mode set, to thereby propose both modes. The MS has only to transmit the Mode Transition Order (ORDQ=1) with fields related to a desired mode set to the BS.

1. Origination of Mode Transition Order in the BS

Figure 6:
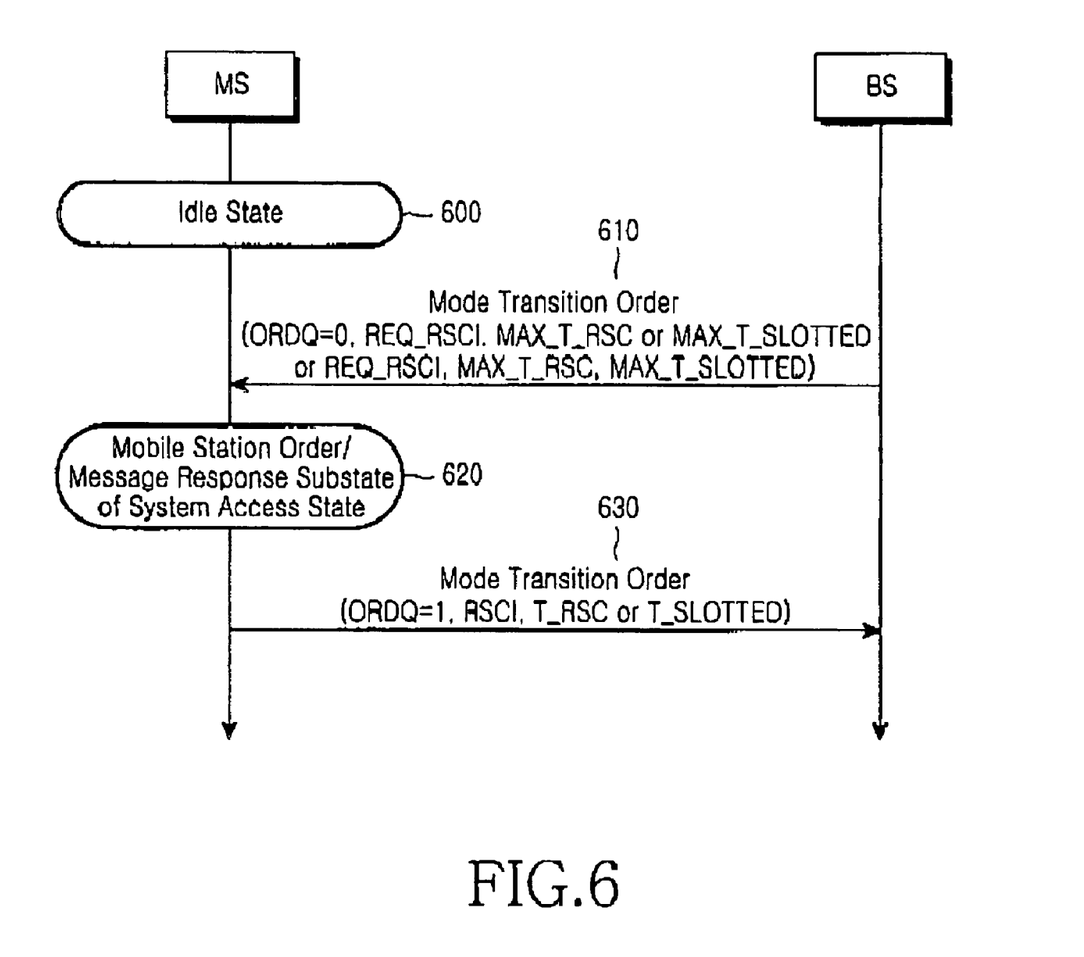
FIG. 6 is a diagram illustrating a signal flow for an SCI changing method for fast paging when the BS originates the Mode Transition Order according to the second embodiment of the present invention.

FIG. 6 is a diagram illustrating a signal flow for an SCI changing method for fast paging when the BS originates the Mode Transition Order according to the second embodiment of the present invention.

Referring to FIG. 6, while the MS is in an idle state in step 600, the BS transmits a Mode Transition Order to the MS in step 610. Because the BS originates the Mode Transition Order, the Mode Transition Order has ORDQ set to 0 and RSC mode parameters (RSCI_INCL, REQ_RSCI, and MAX_T_RSC) or/and non-slotted mode parameters (NON_SLOTTED_INCL and MAX_T_SLOTTED) set to predetermined values. When both modes-related parameters are set, this implies that both modes are proposed. In this case, the MS selects one of the two modes. In the same manner as for the PRM according to the first embodiment of the present invention, the MS decides the RSCI and T_RSC, or T_SLOTTED depending on the RSC mode or the non-slotted mode. After the MS transitions to a mobile station order/message response substate of a system access state in step 620, the MS transmits to the BS a Mode Transition Order containing ODRQ set to 1 and final the RSCI and T_RSC, or T_SLOTTED set to predetermined values. The values are determined in the same procedure as for the PRM as a response for the Page Message.

2. Origination of Mode Transition Order in the MS

Figure 7:
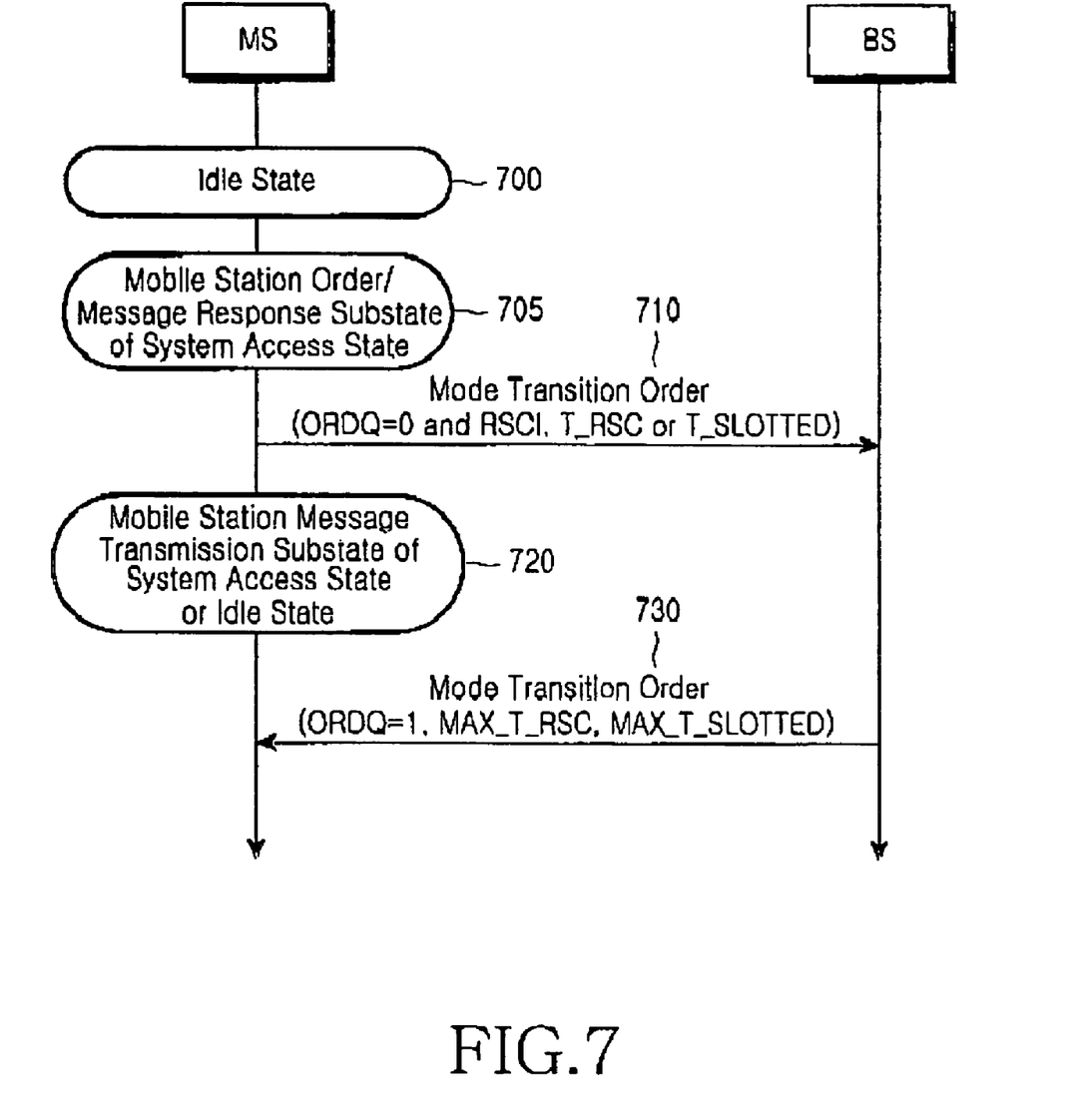
FIG. 7 is a diagram illustrating a signal flow for an SCI changing method for fast paging when the MS originates the Mode Transition Order according to the second embodiment of the present invention.
Figure 8:
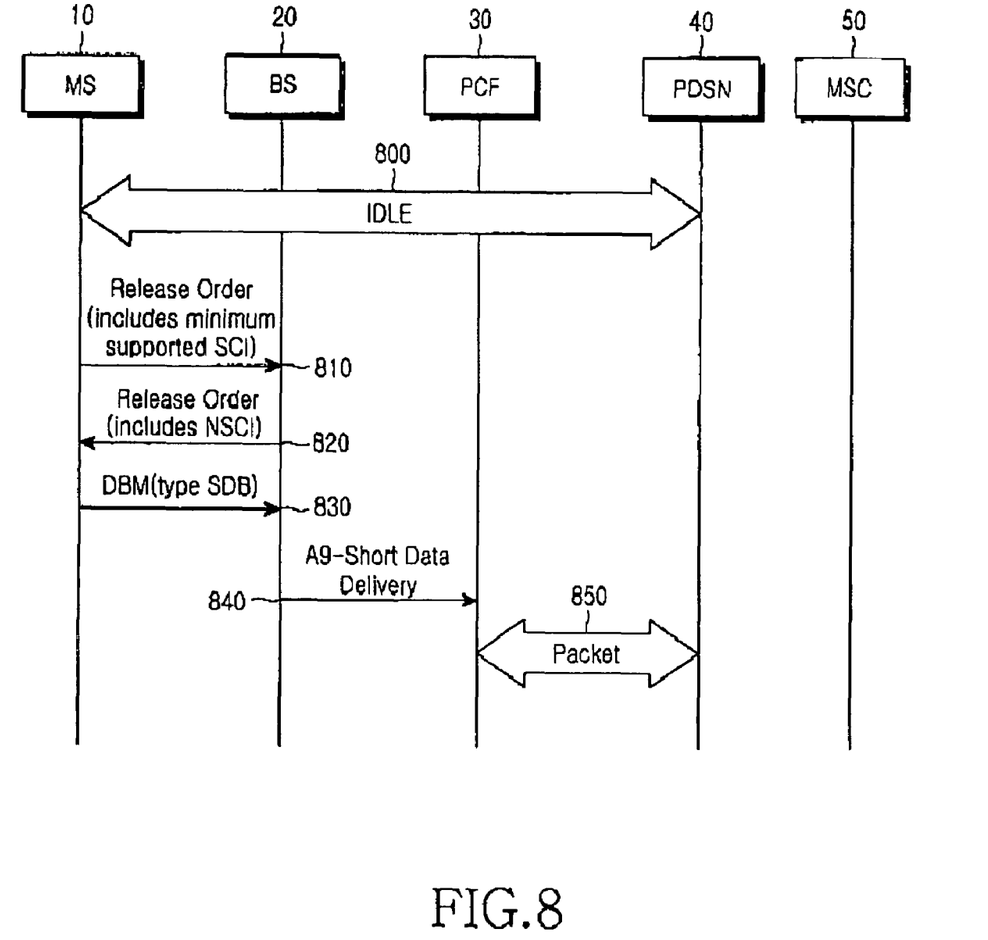
FIG. 8 is a diagram illustrating a signal flow for an SCI changing method for fast paging according to a third embodiment of the present invention.

FIG. 7 is a diagram illustrating a signal flow for an SCI changing method for fast paging when the MS originates the Mode Transition Order according to the second embodiment of the present invention.

Referring to FIG. 7, while the MS is in an idle state in step 700, the MS transitions to the mobile station order/message response substate of the system access state in step 705 and transmits the Mode Transition Order to the BS in step 710. Because the MS originates the Mode Transition Order, the Mode Transition Order has ORDQ set to 0 and the other fields set in the same manner as for the Page Message in the first embodiment of the present invention. The MS transitions to a mobile station transmission substate or an idle state in step 720 and receives a Mode Transition Order as a response message from the BS in step 730. The Mode Transition Order from the BS has ORDQ set to 1. When the MS requests the RSC mode, the message has MAXC_T_RSC without RSCI. If the MS requests the non-slotted mode, the message has only MAX_T_SLOTTED. The MS utilizes MAX_T_RSC or MAX_T_SLOTTED acquired from the response message in the same manner as the Page Message. Then, the MS is able to operate in the RSC mode or in the non-slotted mode.

In the present invention as described above, the SCI of the MS can be dynamically changed by the Page Message or the Mode Transition Order even when the MS is in the idle state or in the system access update overhead information substate in a service supporting fast connection between users such as the PTT service. Therefore, the MS can effectively support the service.

As the BS is capable of reducing the SCI to an intended value, the BS reduces the SCI only for a service requiring fast response such as the PTT service and recovers the SCI after the service. As a result, the battery consumption in the MS is minimized and a faster response is enabled.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A fast paging method of a mobile station (MS), comprising the steps of:
    receiving from a base station (BS) a page message containing information related to a requested period of a slot cycle and a information related to a maximum of an end time of maintaining the period of the slot cycle in an idle state;
    changing the period of the slot cycle based on the information related to the requested period of the slot cycle and maintaining the changed period of the slot cycle until the end time based on the information related to the maximum of the end time; and
    monitoring a paging channel at the changed period of the slot cycle.

2. The method of claim 1, wherein the changed period of the slot cycle is less than or equal to the requested period of the slot cycle and the duration of the maintaining of the changed period of the slot cycle being less than or equal to the maximum of the end time.

3. The method of claim 1, wherein the information related to the maximum of the end time includes two subfields of a time unit and a time interval.

4. The method of claim 1, further comprising the step of transmitting to the BS a page response message containing information related to the changed period of the slot cycle and information related to the end time.

5. The method of claim 1, wherein the page message contains an order qualification code (ORDQ) set to zero.

6. A fast paging method of a mobile station (MS), comprising the steps of:
   transmitting to a base station (BS) an order message with an order qualification code (ORDQ) set to zero, the order message containing information related to a period of a slot cycle and information related to an end time of maintaining the period of the slot cycle in an idle state;
   changing the period of the slot cycle based on the information related to the period of the slot cycle and maintaining the changed period of the slot cycle until the end time based on the information related to the end time; and
   monitoring a paging channel at the changed period of the slot cycle.

7. The method of claim 6, wherein the information related to the end time of the slot cycle includes two subfields of a time unit and a time interval.

8. The method of claim 6, further comprising the step of receiving from the BS an order message with ORDQ set to one, the order message containing information related to a maximum of the end time.

9. The method of claim 8, wherein the duration of the maintaining of the changed period of the slot cycle being less than or equal to the maximum time period.

10. A fast paging method of a mobile station (MS), comprising the steps of:
    transmitting to the MS a page message containing information related to a requested period of a slot cycle and information related to a maximum of an end time of maintaining the period of the slot cycle in an idle state;
    receiving from the MS a page response message containing information related to a period of the slot cycle and information related to the end time determined; and
    changing the period of the slot cycle based on the information related to the period of the slot cycle and maintaining the changed period of the slot cycle until the end time based on the information related to the maximum of the end time.

11. The method of claim 10, wherein the changed period of the slot cycle is less than or equal to the requested period of the slot cycle and the duration of the maintaining of the changed period of the slot cycle being less than or equal to the maximum of the end time.

12. The method of claim 10, wherein the page message contains an order qualification code (ORDQ) set to zero.

13. A fast paging method of a mobile station (MS), comprising the steps of:
    receiving from the MS an order message with a order qualification code (ORDQ) set to zero, the order message containing information related to a period of a slot cycle and information related to an end time of maintaining the period of the slot cycle in an idle state;
    transmitting to the MS an order message with a order qualification code (ORDQ) set to one, the order message containing information related to a maximum of an end time;
    changing the period of the slot cycle based on the information related to the period of the slot cycle and maintaining the changed period of the slot cycle until the end time based on the information related to the end time.

14. The method of claim 13, wherein the changed period of the slot cycle is less than or equal to the requested period of the slot cycle and the duration of the maintaining of the changed period of the slot cycle being less than or equal to the maximum time period.

15. A mobile station supporting a fast paging, comprising
    means for receiving from a base station (BS) a page message containing information related to a requested period of a slot cycle and a information related to a maximum of an end time of maintaining the period of the slot cycle in an idle state;
    means for changing the period of the slot cycle based on the information related to the requested period of the slot cycle and maintaining the changed period of the slot cycle until the end time based on the information related to the maximum of the end time; and
    means for monitoring a paging channel at the changed period of the slot cycle.

16. The method of claim 15, wherein the page message contains an order qualification code (ORDQ) set to zero.

17. A mobile station supporting a fast paging, comprising:
    means for transmitting to a base station (BS) an order message with an order qualification code (ORDQ) set to zero, the order message containing information related to a period of a slot cycle and information related to an end time of maintaining the period of the slot cycle in an idle state;
    means for changing the period of the slot cycle based on the information related to the period of the slot cycle and maintaining the changed period of the slot cycle until the end time based on the information related to the end time; and
    means for monitoring a paging channel at the changed period of the slot cycle.

* * * * *